April 3, 1956  R. F. WYNN  2,740,557
FEED DISTRIBUTING APPARATUS
Original Filed June 28, 1948  2 Sheets-Sheet 1
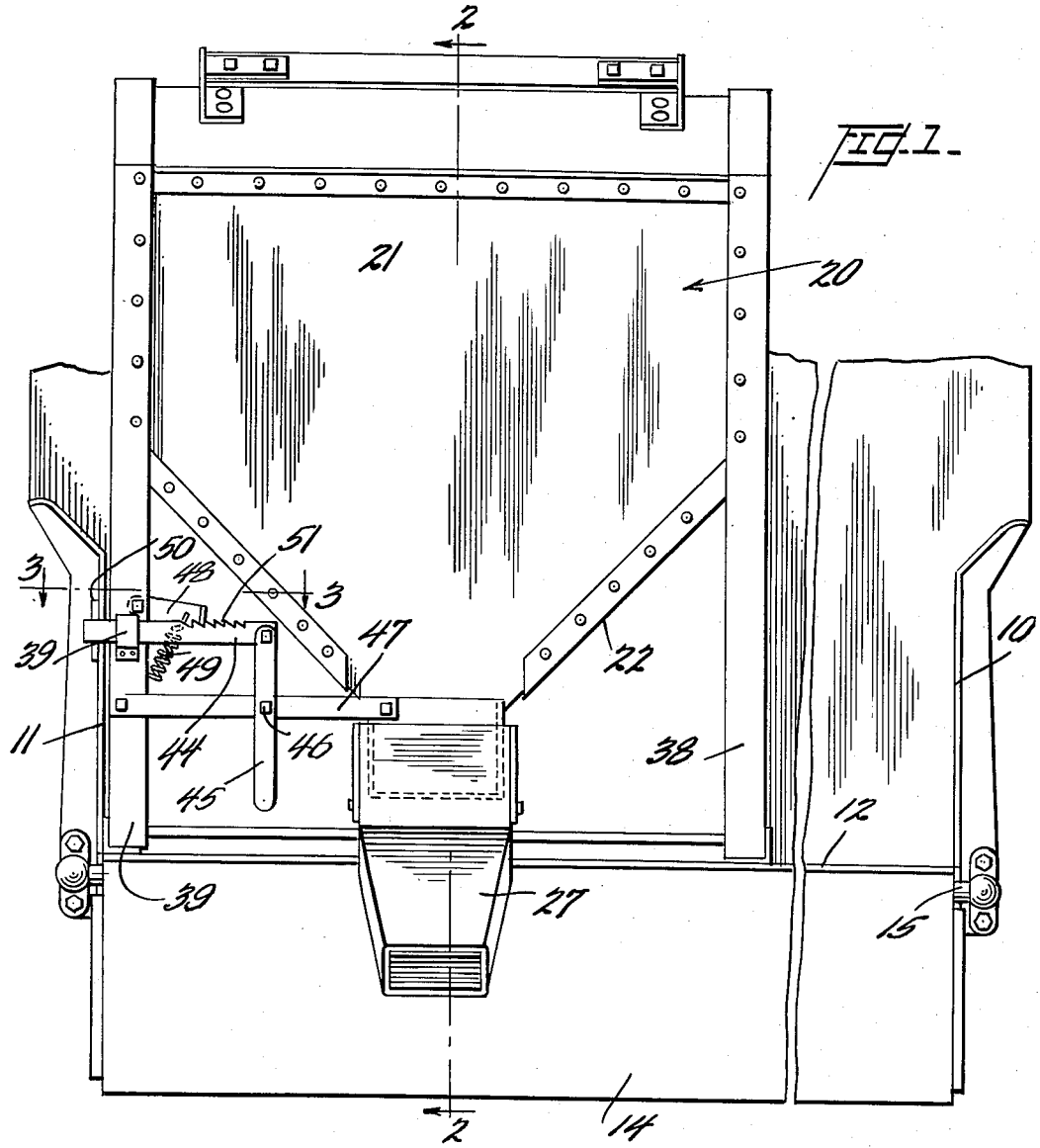
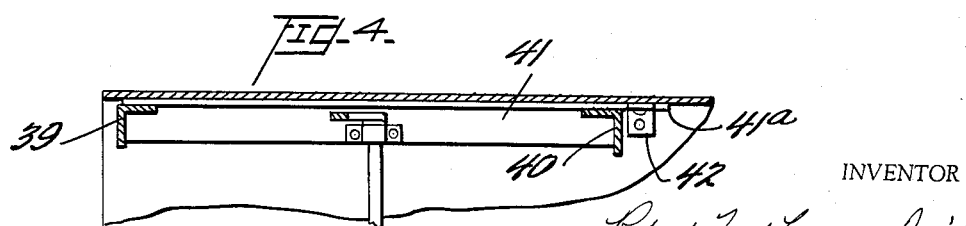
INVENTOR
Robert Fred Wynn, Dec'd
Ida Wynn, Temporary Administratrix
BY Watson, Cole, Grindle & Watson
ATTORNEYS April 3, 1956 R. F. WYNN 2,740,557
FEED DISTRIBUTING APPARATUS
Original Filed June 28, 1948 2 Sheets-Sheet 2
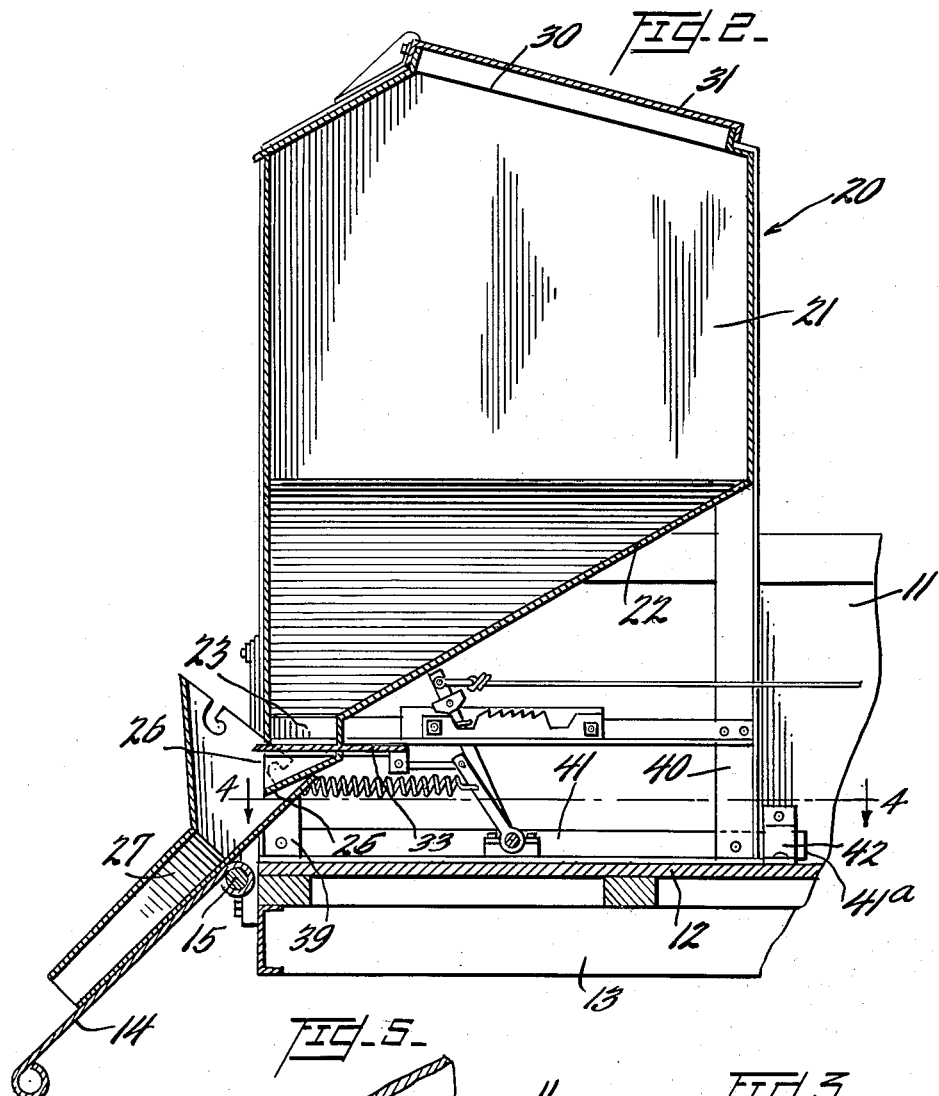
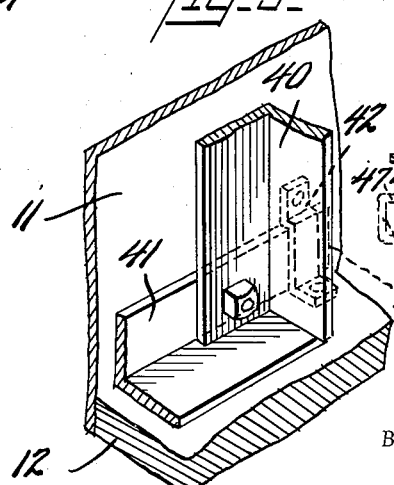
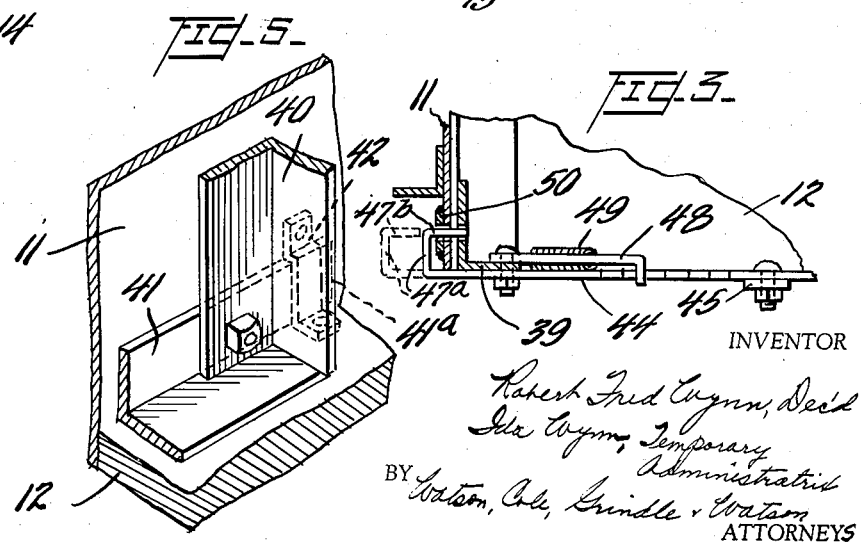
INVENTOR
Robert Fred Wynn, Dec'd
Ida Wynn, Temporary Administratrix
BY Watson, Cole, Grindle & Watson
ATTORNEYS

2,740,557
FEED DISTRIBUTING APPARATUS

Robert Fred Wynn, deceased, late of Bellevue, Tex., by Ida Wynn, administratrix, Bellevue, Tex.

Original application June 28, 1948, Serial No. 35,642, now Patent No. 2,675,947, dated April 20, 1954. Divided and this application January 6, 1953, Serial No. 329,762

2 Claims. (Cl. 222—176)

The present invention relates to apparatus for the distribution of granular, lump or pulverulent material over areas devoted to grazing or agriculture, and comprises essentially a material storage bin or hopper, and a mobile support upon which the bin is detachably mounted in a novel manner. The present application is a division of Serial No. 35,642, filed June 28, 1948 now Patent No. 2,675,947.

More specifically stated the invention contemplates the utilization of a farm conveyance such as a truck which may be freely moved over pasture lands or plowed fields, and which is modified somewhat for the reception of a materials bin equipped with material discharge controlling means, the bin being designed and constructed in such manner as to be readily mounted upon and detachably secured to the vehicle. Thus the vehicle, if a truck, may be used for all purposes for which a truck may normally be employed but may readily be converted, by the mounting of the materials bin thereon, into a materials distributing apparatus. The means for securing the bin to the truck body is of novel character, enabling the attachment to be effected with minimum effort and the removal of the bin from the truck to be accomplished quickly, the bin being firmly held in position while mounted, however, despite movement of the vehicle over rough ground.

One embodiment of the invention is illustrated in the accompanying drawings in which, Figure 1 shows in end elevation the rear end of a truck body and, in front elevation, the materials holding bin mounted upon the truck;

Figure 2 is a section on line 2—2 of Figure 1;

Figure 3 is a section on line 3—3 of Figure 1;

Figure 4 is a section on line 4—4 of Figure 2; and

Figure 5 is a perspective view of a detail.

The mobile support or vehicle upon which the materials bin is mounted may be a truck having an open body with parallel sides, such for instance as that partially illustrated in the drawings, the sides of the truck body being indicated at 10 and 11 respectively, the bottom or floor at 12, supporting frame at 13 and pivoted back wall or tail gate at 14, this tail gate being mounted for swinging movement upon the horizontal shaft 15 in customary manner. The bin or hopper is generally indicated at 20 and, in the form of the invention shown, comprises the bin proper 21, having vertical side walls and a hopper shaped bottom indicated generally at 22 comprising three inclined bottom plates extending downwardly from the side walls toward a port 23 through which the material to be dispensed will be allowed to descend in regulated amounts under control of the operator. Below discharge port 23 is an integral spout-like extension 25 for directing the falling material downwardly and outwardly through a vertical discharge port 26. Material passing through discharge port 26 will enter a material directing chute 27 and pass through the chute to the ground, the chute being supported in the manner in which it is shown in Figure 2, for inclined discharge. Material is introduced through an opening 30 in the top of the bin, this opening being normally closed by a hinged cover 31, and the discharge of the material through the discharge spout just described is controlled by means of a horizontally disposed sliding gate 33.

The bin or hopper 21 is provided with four supporting legs which may conveniently be angle members such as indicated at 38, 39 and 40 at three of the corners of the bin and by a similar member (not illustrated) at the remaining corner. At their lower ends the four legs are connected together by horizontally extending structural members so that the frame comprises a rigid structural unit. It is detachably secured in position upon the truck body. Thus the corner of the frame at leg 40 is separately attached to the side wall of the truck body, the vertical flange of the angle member 41 having an extension 41a which is adapted to enter a correspondingly shaped recess defined by the strap 42 rigidly attached to the inner face of the side 11 of the truck body. By a horizontal or sliding movement the extension 41a may be withdrawn from the retaining strap and this extension may be as readily engaged with the retaining strap when the materials bin is again mounted upon the truck body.

The left rear corner is latched to the side wall 11 of the truck body by latching member 44 which may be horizontally reciprocated by means of a lever 45 pivoted at 46 upon a rigid cross brace 47. Latch 44 slidably rests upon a bracket 39a secured to the leg 39 and the outer end of the latch is provided with a laterally extending portion 47a and a terminal portion 47b parallel to the latch body. By reciprocating the latch in the direction of its length its terminal portion 47b may be caused to pass into aligned apertures formed in the side wall 11 of the truck body, the leg 39 of the hopper frame, and a reinforcing plate 50 attached to the truck side wall. When in the position in which it is shown in full lines in Figure 3 the latch 44 secures the hopper frame and hopper against movement relatively to the truck body, When moved to the position in which it is shown in dotted lines in Figure 3 the hopper frame is released by the latch and may be withdrawn by a motion which frees the extension 41a of bracket 41 from the strap 42. A locking dog or detent 48, normally drawn downwardly onto the latch 44 by a spring 49, engages one or the other of the teeth 51 and holds the latch in locking relation to the side wall until lifted.

The feed distributing apparatus which comprises the subject matter of this invention may conveniently be fabricated of iron or steel sheets and structural shapes, secured together by welding, riveting or by bolts or screws. Within the import of the invention, however, the materials used in the fabrication of the apparatus may be varied widely, likewise the methods or means for securing the respective elements of the apparatus in fixed relationship.

By the means described and illustrated the feed distributing bin disclosed, or any generally similar bin, may be securely mounted upon a truck body of conventional character prior to use and readily detached after use. Thus the truck may be employed for general purposes whenever needed, the feed distributing bin being placed in storage during such use. In adapting the invention to truck bodies and feed bins of somewhat different types, it may be necessary to slightly modify the elements of the invention in design and arrangement, without modification of function or result.

Having thus described the invention, what is claimed as new and desired to be secured by Letters Patent is:

1. In a feed distributing apparatus, in combination, a mobile support including a truck body having a generally horizontal floor and a vertically disposed side wall, a distributor for granular material adapted to be carried by said support and including a hopper having a discharge port and a hopper supporting frame having truck body floor engaging portions, and means for detachably securing said distributor to said truck body in position to discharge granular material over the rear edge of the floor of said body, said means including latch mechanism for latching the frame of the distributor to the side wall of the truck body, said latch mechanism being mounted on the hopper frame and having a latch member mounted for sliding movement into or out of engagement with the side wall of the truck body, said wall having an aperture for the reception of the said latch member.

2. In a feed distributing apparatus, in combination, a mobile support including a truck body having a generally horizontal floor and a vertically disposed side wall, a distributor for granular material adapted to be carried by said support and including a hopper having a discharge port and a hopper supporting frame having truck body floor engaging portions, and means for detachably securing said distributor to said truck body in position to discharge granular material over the rear edge of the floor of said body, said means including latch mechanism mounted on the hopper supporting frame for latching the frame of the distributor to the side wall of the truck body, said latch mechanism comprising a sliding latch member having a wall-engaging end portion, said wall-engaging end portion of said latch member being substantially U-shaped and said latch mechanism mounting slidably supporting said latch member for reciprocatory movement along a path beyond the end of the truck body side wall, said side wall being provided with an aperture into which the terminal of said latch end portion may be moved.

References Cited in the file of this patent

UNITED STATES PATENTS

| | | |
|---|---|---|
| 2,223,275 | Valenzuela | Nov. 26, 1940 |
| 2,233,005 | Garlinghouse | Feb. 25, 1941 |
| 2,427,603 | Higgins | Sept. 16, 1947 |
| 2,490,241 | Smith et al. | Dec. 6, 1949 |
| 2,557,704 | Stevens | June 19, 1951 |